United States Patent
Munari

(10) Patent No.: US 11,607,081 B2
(45) Date of Patent: Mar. 21, 2023

(54) REMOVABLE HANDLE, PARTICULARLY FOR COOKING CONTAINERS FOR FOOD

(71) Applicant: LA TERMOPLASTIC F.B.M. S.R.L., Arsago Seprio (IT)

(72) Inventor: Marco Munari, Cardano al Campo (IT)

(73) Assignee: LA TERMOPLASTIC F.B.M. S.R.L., Arsago Seprio (IT)

( * ) Notice: Subject to any disclaimer, the term of this patent is extended or adjusted under 35 U.S.C. 154(b) by 179 days.

(21) Appl. No.: 17/166,631

(22) Filed: Feb. 3, 2021

(65) Prior Publication Data

US 2021/0235939 A1    Aug. 5, 2021

(30) Foreign Application Priority Data

Feb. 4, 2020  (IT) .......................... 102020000002119

(51) Int. Cl.
*A47J 45/07*   (2006.01)
(52) U.S. Cl.
CPC .................................. *A47J 45/071* (2013.01)
(58) Field of Classification Search
CPC ....................................................... A47J 45/071
USPC ................................................ 220/759, 573.1
See application file for complete search history.

(56) References Cited

U.S. PATENT DOCUMENTS

| 3,272,547 | A | * | 9/1966 | Pryce | ..................... | A47J 45/08 |
| | | | | | | 220/759 |
| 4,577,367 | A | | 3/1986 | Durand | | |
| 8,302,807 | B2 | * | 11/2012 | Baumgarten | ......... | A47J 45/071 |
| | | | | | | 220/573.1 |
| 2012/0073085 | A1 | * | 3/2012 | Munari | ................. | A47J 45/071 |
| | | | | | | 16/425 |
| 2014/0103672 | A1 | * | 4/2014 | Baumgarten | ......... | A47J 45/071 |
| | | | | | | 294/31.1 |
| 2018/0070777 | A1 | * | 3/2018 | Dichraff | ................ | A47J 45/071 |

(Continued)

FOREIGN PATENT DOCUMENTS

| CN | 101112290 A | 1/2008 |
| EP | 2499948 A1 | 9/2012 |

(Continued)

OTHER PUBLICATIONS

RU Office Action dated Sep. 10, 2021 re: Application No. 2021101478/03, pp. 1-12, citing: RU 2533700 C2, EP 2499948 A1, KR 1020080010309 A, CN 101112290 B and JP 2014036838 A.

*Primary Examiner* — J. Gregory Pickett
*Assistant Examiner* — Niki M Eloshway
(74) *Attorney, Agent, or Firm* — Cantor Colburn LLP

(57) ABSTRACT

A removable handle, particularly for cooking containers for food, includes
  a base portion adapted to be fixed immovably to a wall of a cooking vessel and having a coupling body;
  and a handle portion adapted to be detachably fixed to the base portion and including a coupling cavity to receive the coupling body of the base portion. The coupling body is insertable in the coupling cavity along a main coupling direction.
A locking and unlocking lever which can be activated to lock and unlock the coupling body inside said coupling cavity is also part of the removable handle.
The lever is hinged to the handle portion about an axis of rotation substantially parallel to the main coupling direction. The lever includes at least a first relief, the coupling body has at least a second relief to engage with the first relief.

9 Claims, 4 Drawing Sheets

(56) References Cited

U.S. PATENT DOCUMENTS

| | | | |
|---|---|---|---|
| 2019/0059656 A1* | 2/2019 | Bucklew | A47J 37/108 |
| 2020/0245819 A1* | 8/2020 | Besche | A47J 45/071 |
| 2022/0211218 A1* | 7/2022 | Bouvet | A47J 45/071 |

FOREIGN PATENT DOCUMENTS

| | | |
|---|---|---|
| EP | 2424415 B1 | 4/2013 |
| JP | 2014036838 A | 2/2014 |
| KR | 20080010309 A | 1/2008 |
| KR | 101596210 B1 | 2/2016 |
| RU | 2533700 C2 | 11/2014 |
| WO | 2010125437 A1 | 11/2010 |

* cited by examiner

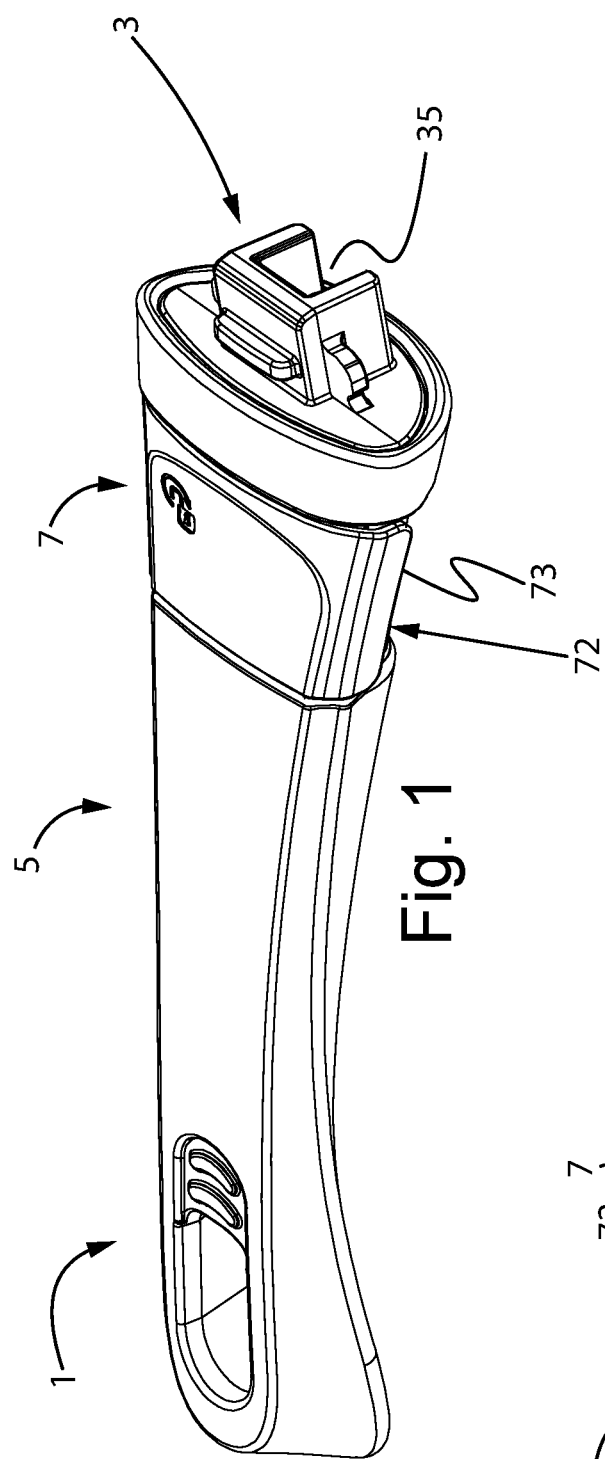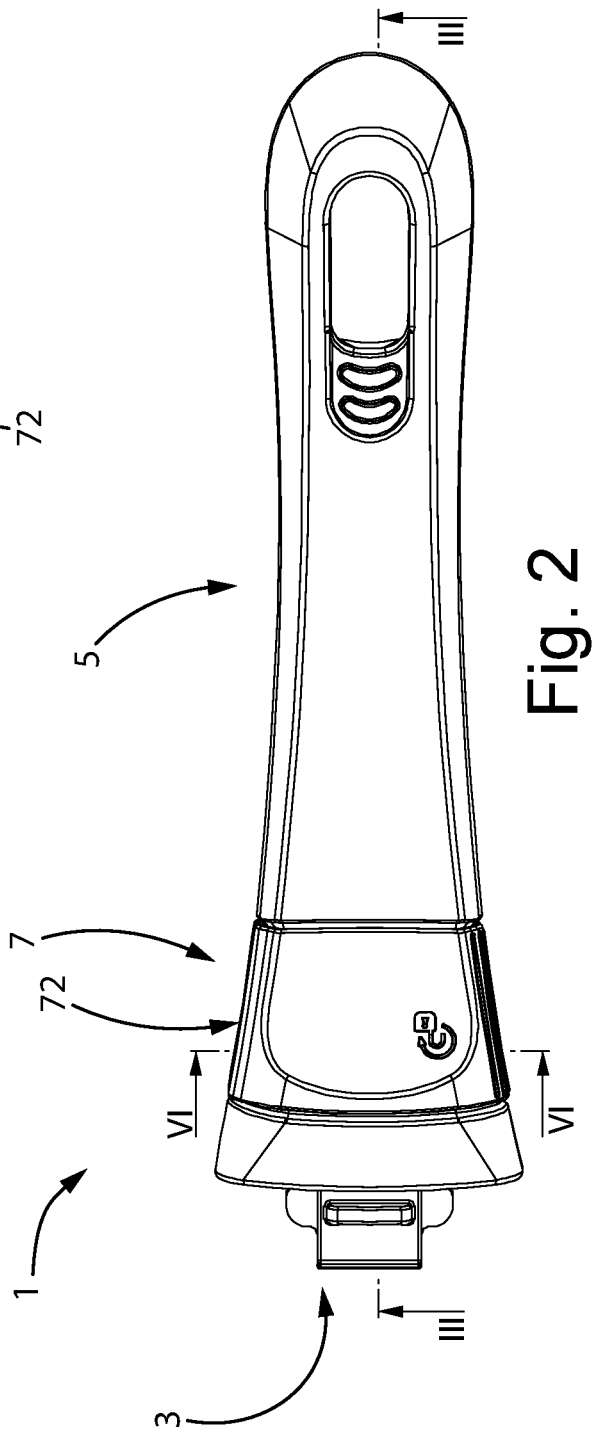

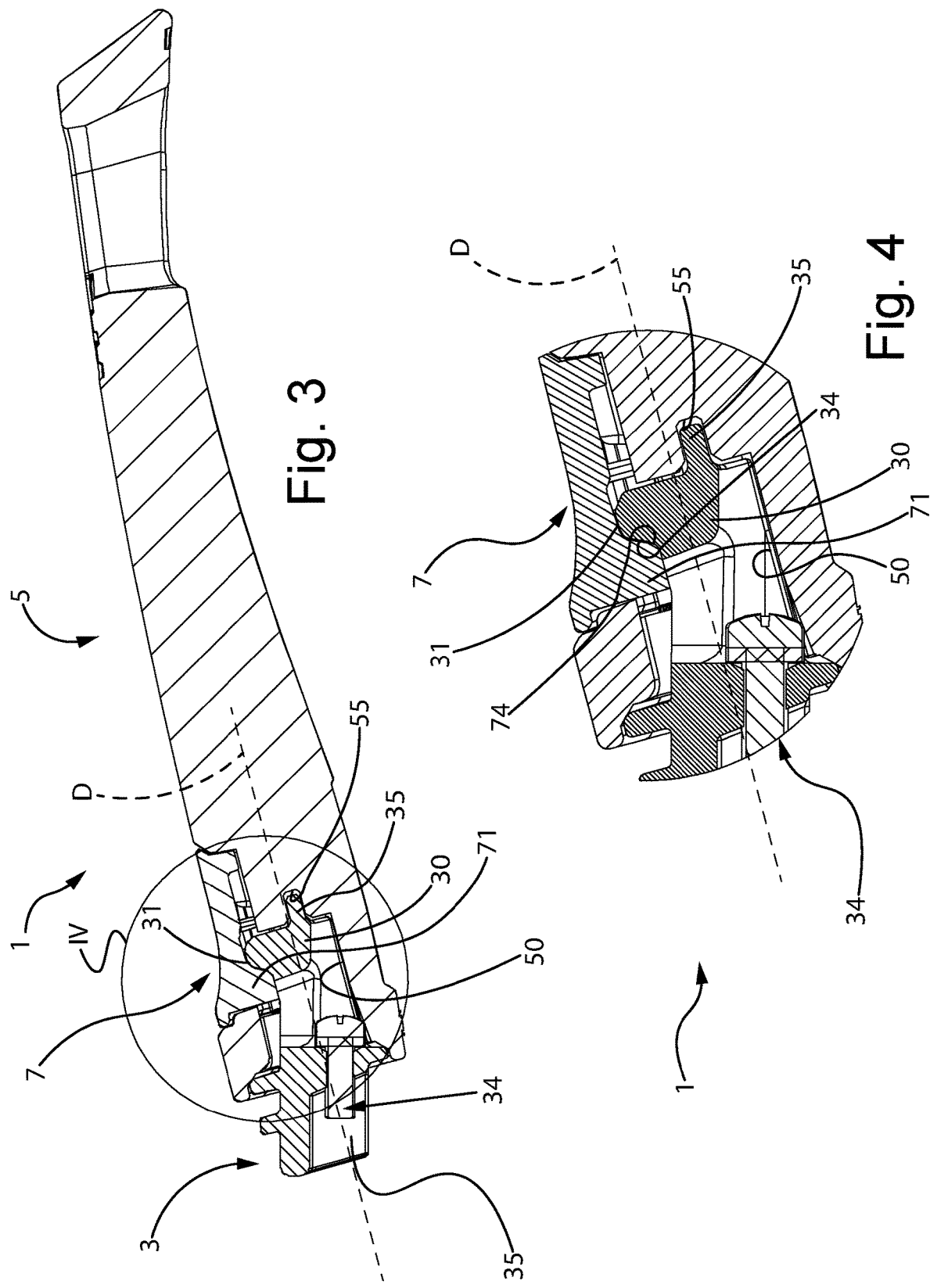

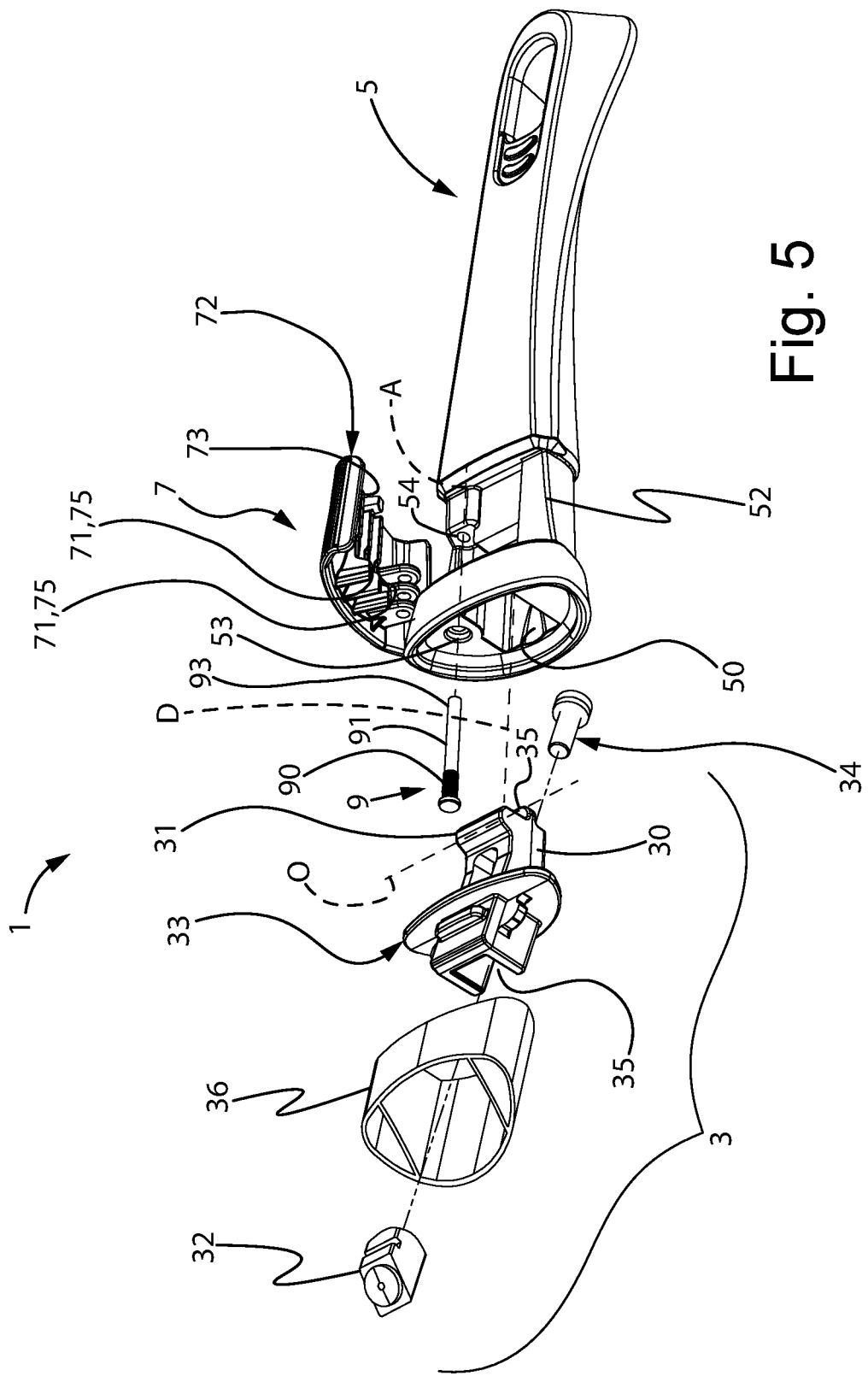

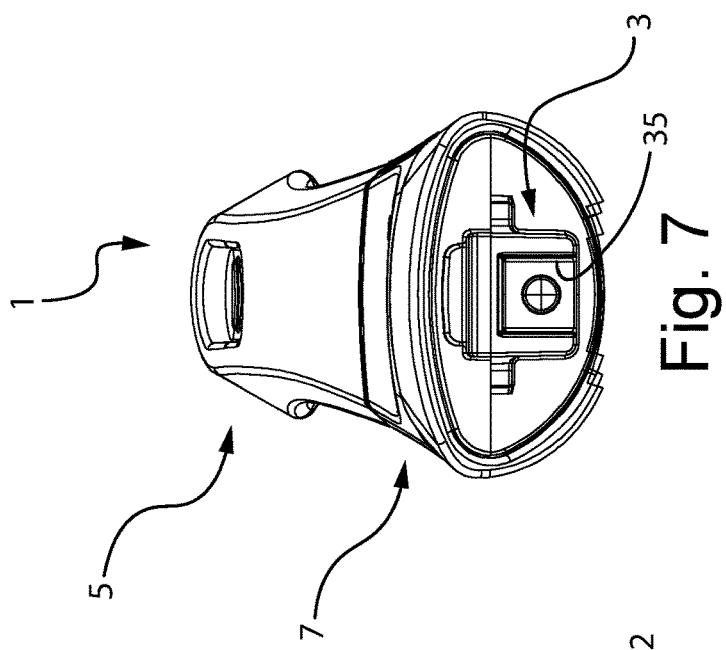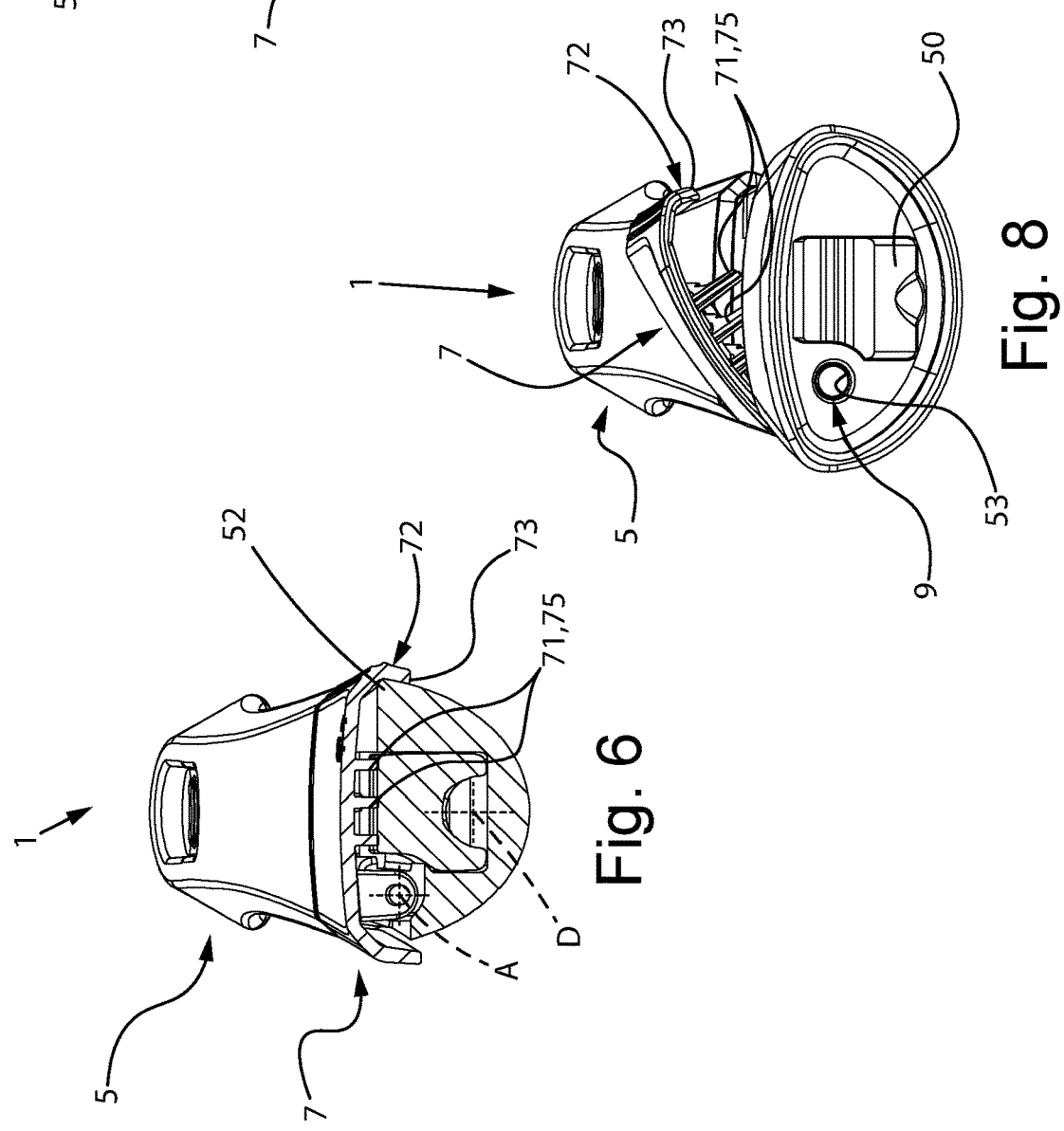

REMOVABLE HANDLE, PARTICULARLY FOR COOKING CONTAINERS FOR FOOD

CROSS-REFERENCE TO RELATED APPLICATIONS

This application is related to and claims the benefit of Italian Patent Application No. 102020000002119, filed on Feb. 4, 2020, the contents of which are herein incorporated by reference in their entirety.

TECHNICAL FIELD

The present disclosure relates to a removable handle, particularly for cooking containers for food, in particular but not exclusively for pans.

BACKGROUND

As is known, the most common containers intended for cooking food in general such as, for example, frying pans, saucepans and pans, are provided with handles or hand grips that enable the easy gripping thereof, even when the container is full and is hot. In particular, pans are normally provided with a single handle with an elongated shape, preferably made of polymer material, such as bakelite, which extends radially in a cantilever fashion from a lateral wall of the pan and that is constrained to the latter by means of screws or rivets.

To reduce the total space occupied by the pans or other analogous containers, e.g. in case they need to be placed in the fridge, inside ovens, or they need to be washed, or even in the case of industrial storage, before being sold, or domestic storage, it is known to have removable handles, provided with coupling and uncoupling systems to the lateral wall of the container. Furthermore, a same removable handle can be used for handling different containers or, vice versa, a same container can be associated with different removable handles according to the intended use.

There are currently numerous examples of removable handles for cooking containers in general, but which have coupling and uncoupling systems that are complicated both to manufacture and to use, as they have a notable number of components to be assembled to one another. Furthermore, such complex construction often results in lower durability of the handles, due to damage to the weaker components of the coupling and uncoupling systems, which compromise the use of the handle and make it unsafe. Again, this mainly relates to handles that require coupling with especially constructed cooking containers, i.e. provided with specific attachment means, not of the type normally available on the market.

SUMMARY

The general aim of the present disclosure is the fact of making a removable handle particularly for cooking containers for food, which is able to overcome the drawbacks of the prior art mentioned above, in a simply, cheaply and particularly functionally way.

Within the scope of this general aim, the present disclosure provides a removable handle that has a reduced number of components.

Another aim of the disclosure is the fact of making a removable handle that is both simple to make and assemble, and simple to use.

Another aim of the disclosure is the fact of making a removable handle that can be easily adapted to the types of cooking containers for food already on the market.

Another aim of the disclosure is the fact of making a removable handle that is economically competitive compared to the prior art.

The task set out above, and the aims mentioned and others that will appear more clearly below, are reached by a removable handle, particularly for cooking containers for food as disclosed in the independent claim.

Other features are comprised in the dependent claims.

BRIEF DESCRIPTION OF THE DRAWINGS

Further features and advantages shall be more apparent from the description of a preferred, but not exclusive, embodiment of a removable handle, illustrated merely by way of non-limiting example with the aid of the accompanying drawings, in which:

FIG. 1 is a perspective view of an embodiment of a removable handle, according to the disclosure;

FIG. 2 is a plan view from above of the removable handle of FIG. 1, according to the disclosure;

FIG. 3 is a sectional view of the removable handle represented in FIG. 2, performed according to the axis III-III;

FIG. 4 is an enlargement of the part comprised in the circle indicated with IV of the removable handle represented in FIG. 2;

FIG. 5 is an exploded view that illustrates all the components of the removable handle of FIG. 1, according to the disclosure;

FIG. 6 is a sectional view of the removable handle represented in FIG. 2, performed according to the axis VI-VI;

FIG. 7 is a front raised view of the removable handle of FIG. 1, according to the disclosure; and FIG. 8 is a front raised view of the removable handle of FIG. 1, according to the disclosure with the locking and unlocking lever raised and the components of the base portion removed.

DETAILED DESCRIPTION OF THE DRAWINGS

With reference to the cited figures, the removable handle, particularly for cooking containers for food, indicated overall with reference number 1, comprises:

- a base portion 3 adapted to be immovably fixed to a wall of a cooking vessel and comprising a coupling body 30;
- a handle portion 5 adapted to be detachably fixed to the base portion 3 and comprising a coupling cavity 50 configured to receive the coupling body 30 of the base portion 3, where the coupling body 30 is insertable in the coupling cavity 50 along a main coupling direction D,
- a locking and unlocking lever 7 which can be activated to lock and unlock the coupling body 30 inside the coupling cavity 50.

According to the disclosure, the locking and unlocking lever 7 is hinged to the handle portion 5 around an axis of rotation A substantially parallel to the main coupling direction D. The locking and unlocking lever 7 comprises at least a first relief 71. Similarly, also the coupling body 30 comprises at least a second relief 31 configured to engage with said the first relief 71 of the locking and unlocking lever 7. The locking and unlocking lever 7 is rotatable about the axis of rotation A between a locking position in which the first relief 71 of the locking and unlocking lever 7 holds the second relief 31 of the coupling body 30 so that the coupling body 30 is locked inside the coupling cavity 50 and an unlocking position in which the first relief 71 and the second relief 31 are not mutually engaged so that the coupling body 30 is free to move with respect to the coupling cavity 50. Furthermore, the locking and unlocking lever 7 comprises an elastically deformable portion 72 configured to snap engage a corresponding rigid portion 52 of the handle portion 5 when the locking and unlocking lever 7 is in the locking position.

Based on the above, the result is that the locking and unlocking lever 7 moves, about the axis of rotation A, in a substantially orthogonal plane to the main coupling direction D. In this way, any traction forces of the handle portion 5 with respect to the base portion 3 that would tend to separate the two components from one another and that are preferentially transmitted along the main coupling direction D tend to be non-influential with respect to the locking and unlocking movement (i.e., closing and opening movement) of the lever 7. Therefore, in order for the locking and unlocking lever 7 to remain closed in its locking position, it is sufficient for the elastically deformable portion 72 of the lever 7 itself to impose minimum resistance to opening. In this way it is possible to prevent the accidental opening of the locking and unlocking lever 7 when it is in the unlocked position, also when faced with remarkable traction forces that act in the main coupling direction D.

Preferably, as illustrated in the appended figures, the main coupling direction D of the coupling body 30 in the coupling cavity 50 is substantially parallel to the longitudinal extension direction of the handle portion 5.

Advantageously, as explained below, the second relief 31 has, in the part facing the first relief 71, a shape at least partly complementary to the shape of the first relief 71 of the locking and unlocking lever 7. In other words, the first relief 71 and the second relief 31 are shaped so as to engage mutually with one another in the closing position of the locking and unlocking lever 7.

Advantageously, the elastically deformable portion 72 is defined by an end portion 73 of the lever 7, folded so as to engage with the rigid portion 52 of the handle portion 5.

Advantageously, as illustrated in FIG. 5, the elastically deformable portion 72 and the rigid portion 52 both extend along a mostly longitudinal extension direction, preferably parallel (or however defining a reduced angle with respect) to the longitudinal extension direction of the handle portion 5.

As illustrated both in FIG. 5 and in FIG. 6, the rigid portion 52 can comprise an angled portion 55 which defines an undercut suitable for enabling the snap connection of the folded end portion 73 of the lever 7.

Advantageously, the end portion 73 of the lever 7 is made of a more deformable material, within the elastic range, of the material of which the rigid portion 52 of the handle portion 5 is made. In other words, the end 73 of the lever 7 is made of a material that has a lower elastic modulus with respect to that of the rigid portion 52 of the handle portion 5 so as to further promote the snap elastic deformation of the end 73 thereof when the lever 7 is in the locked position.

In particular, the handle portion 5, and specifically the rigid portion 52 thereof, can be made of a material such as bakelite. The lever 7, and in particular its elastically deformable end 73, is instead made of a less rigid polymer material than bakelite.

Advantageously, the base portion 3 comprises a pin 32, also known as a "goujon", preferably of the universal type, adapted to be immovably fixed to the wall of said cooking vessel and an attachment element 33 fixed, on a first side, to the pin 32 by means of fixing means 36 and comprising, on a second side opposite to said first side, the coupling body 30.

The possibility to use a pin 32 of the universal type makes the removable handle 1 immediately adaptable also to cooking vessels already on the market, without any modifications to the vessels themselves being required.

Advantageously, the attachment element 33 comprises a seat 35 provided to enable a shape coupling with the pin 32. The fixing means 36 is therefore such as to fix the pin 32 to the inside of the seat 35 of the attachment element 33.

As illustrated in FIG. 5, the base portion 3 can also comprise a ring nut 36 adapted to surround the attachment element 33 at least in the part which, in the mounted configuration of the removable handle 1, is not inserted into the handle portion 5.

Advantageously, the locking and unlocking lever 7 is hinged to the handle portion 5 by means of a plug 9 which comprises a first portion 90 fixed to the handle portion 5 and a second portion 92 associated with the locking and unlocking lever 7 so as to allow rotation of the locking and unlocking lever 7 around such second portion 92 of the plug 9.

The only relative movement allowed between the handle portion 5 and the locking and unlocking lever 7 is therefore the rotation of the lever 7 about the axis of rotation A.

Advantageously, the first portion 90 of the plug 9 is knurled and the plug is inserted by pressure into a hole 53 obtained in the handle portion 5. The presence of the knurl confers adherence between the knurled portion 90 and the walls of the hole 53.

Advantageously, the plug 9 comprises a further end portion 93 adapted to be inserted into a further hole 54 obtained in the handle portion 5 downstream of the second intermediate portion 92, to which the lever 7 is instead hinged.

Advantageously, the at least one first relief 71 present in the lever 7 substantially affects the entire width of the coupling cavity 50.

Advantageously, the at least one second relief 31 present in the coupling body 30 substantially affects the entire width of the coupling body 30.

As illustrated in particular in FIG. 5, the at least one second relief 31 present in the coupling body 30 is a single continuous relief defined by a single body that substantially covers the entire width of the coupling body 30, along a direction O substantially orthogonal to the main coupling direction D.

As illustrated in FIG. 5 and in FIG. 8, the at least one first relief 71 present in the lever 7 is instead defined by a plurality of raised teeth 75 also distributed along a substantially orthogonal direction to the main coupling direction D, so as to occupy the width of the coupling cavity 50 when the lever 7 is closed in the locking position.

Alternatively, the first relief 71 may be a continuous relief defined by a single body and the second relief 31 may be defined by a plurality of raised teeth.

Advantageously, both the first relief 71 and the second relief 31 may be comprised by a single continuous relief defined by a single body, or by a plurality of raised teeth having a desired thickness and mutually abutting against one another.

Advantageously, when the locking and unlocking lever 7 is in the locking position, the at least one first relief 71 has a first face 74 abutting against a corresponding second face 34 of the second relief 31, where the first face 74 and the second face 34 are inclined with respect to the main coupling direction D.

In this way the closure of the lever in the locking position also guarantees clamping along the main coupling direction D of the handle portion 5 to the base portion 3.

Advantageously, the coupling body 30 comprises a guide tongue 35 configured to be inserted within a guide slot 56 obtained in the handle portion 5 within the coupling cavity 50.

Advantageously, with the exclusion of the base portion 3, which can have a number and type of components that are also dependent on the container with which the removable handle 1 is associated exclusively comprises three components, i.e. (i) the handle portion 5, which can be made as a single piece; (ii) the locking and unlocking lever 7, which can also be made as a single piece; and (iii) the plug 9 which enables the locking and unlocking lever 7 to be fixed rotatably to the handle portion 5.

The handle portion 5 can have a handle conformation, but also a hand grip or knob conformation. Furthermore, a single cooking vessel can envisage the presence of two (or more) removable handles, or hand grips, or knobs, as described above.

The operation of the removable handle 1 is clear and evident from the description.

In particular, the removable handle 1 has a base portion 3 which can be fixed, thanks to the pin 32, preferably of the universal type, to a wall of any cooking vessel.

The handle portion 5 can be mounted onto the base portion 3 by following the following steps:
  opening the locking and unlocking lever 7,
  moving the handle portion 5 towards the base portion 3 until the coupling body 30 is not inserted into the coupling cavity 50,
  closing the lever 7 so that the two reliefs 71 and 31 abut against one another and so that the elastically deformable portion 72 of the lever 7 is snap engaged to the corresponding rigid portion 52 of the handle portion 5.

The removal of the handle portion 5 requires the opening of the lever 7 until the two reliefs 71 and 31 are mutually separate from one another and the distancing of the handle portion 5 with respect to the base portion 3.

It has in practice been noted how the removable handle, particularly for cooking containers for food, according to the present disclosure, achieves the predefined aims as it is easy to make, assemble and use.

Another advantage of the removable handle, according to the disclosure, is the fact of guaranteeing safe and resistant fixing of the handle portion to the base portion, which fixing does not suffer from any traction forces or other types of forces that tend to separate the aforesaid two components from one another.

A further advantage of the removable handle, according to the disclosure, is the fact that the locking in the locking position of the locking and unlocking lever can also be obtained with reduced forces without this jeopardising the performance of the removable handle itself during use.

Another advantage of the removable handle, according to the disclosure, is the fact of being able to be adapted also to cooking vessels already on the market.

A further advantage of the removable handle, according to the disclosure, is the fact that it has a reduced number of components, and therefore it is overall much simpler to assemble and at the same time much less susceptible to breaking.

The removable handle as it is conceived is susceptible to numerous modifications and variants, all falling within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A removable handle comprising:
  a base portion adapted to be fixed immovably to a wall of a cooking vessel and comprising a coupling body;
  a handle portion adapted to be detachably fixed to said base portion and comprising a coupling cavity configured to receive said coupling body of said base portion, said coupling body being insertable in said coupling cavity along a main coupling direction; and
  a locking and unlocking lever which can be activated to lock and unlock said coupling body inside said coupling cavity,
  wherein
  said locking and unlocking lever is hinged to said handle portion around a rotation axis substantially parallel to said main coupling direction (D), said locking and unlocking lever comprising at least a first relief,
  said coupling body comprising at least a second relief configured to engage with said first relief of said locking and unlocking lever,
  said locking and unlocking lever being rotatable about said rotation axis between a locking position in which said first relief of said locking and unlocking lever holds said second relief of said coupling body so that said coupling body is locked inside said coupling cavity and an unlocking position in which said first relief and said second relief are not mutually engaged so that said coupling body is free to move with respect to said coupling cavity,
  said locking and unlocking lever comprising an elastically deformable portion configured to snap engage a corresponding rigid portion of said handle portion when said locking and unlocking lever is in said locking position, wherein said elastically deformable portion is defined by an end portion of said lever folded to engage with said rigid portion of said handle portion.

2. The removable handle, according to claim 1, wherein said elastically deformable portion and said rigid portion both extend along a longitudinal development direction, parallel to the longitudinal development direction of said handle portion.

3. The removable handle, according to claim 1, wherein said rigid portion comprises an angled portion which defines an undercut suitable for enabling the snap connection of said end portion of said locking and unlocking lever.

4. The removable handle, according to claim 1, wherein said end portion of said locking and unlocking lever is made of a material that is more deformable, within the elastic range, of the material in which said rigid portion of said handle portion is made.

5. The removable handle, according to claim 1, wherein said base portion comprises a pin adapted to be fixed immovably to the wall of said cooking vessel and an attachment element fixed, on a first side, to said pin by fixing means and comprising, on a second side opposite to said first side, said coupling body.

6. The removable handle, according to claim 1, wherein said locking and unlocking lever is hinged to said handle portion by a plug which comprises a first portion fixed to said handle portion and a second portion associated with said locking and unlocking lever to allow rotation of said locking and unlocking lever around said second portion of said plug.

7. The removable handle, according to claim 1, wherein said at least one first relief substantially extends along the entire width of said coupling cavity.

8. The removable handle, according to claim 1, wherein said at least one second relief substantially extends along the entire width of said coupling body.

9. The removable handle, according to claim 1, wherein, when said locking and unlocking lever is in said locking position, said at least one first relief has a first face abutting against a corresponding second face of said second relief, and said first face and said second face are inclined with respect to said main coupling direction.

* * * * *